United States Patent [19]

Hausdorff

[11] 4,192,006
[45] Mar. 4, 1980

[54] PORTABLE TRAVEL EXPENSE TABULATOR

[76] Inventor: Harry H. Hausdorff, 270 Westport Rd., Wilton, Conn. 06897

[21] Appl. No.: 931,363

[22] Filed: Aug. 7, 1978

[51] Int. Cl.² ............................................. G06F 15/30
[52] U.S. Cl. .................................... 364/715; 364/408; 364/464; 364/900
[58] Field of Search ............... 364/715, 705, 464, 467, 364/401, 408, 900

[56] References Cited

U.S. PATENT DOCUMENTS

| | | | |
|---|---|---|---|
| 3,920,979 | 11/1975 | Kilby et al. | 364/705 |
| 4,090,247 | 5/1978 | Martin | 364/900 |
| 4,092,523 | 5/1978 | Tava et al. | 340/347 DD |
| 4,115,870 | 9/1978 | Lowell | 364/900 |
| 4,117,542 | 9/1978 | Klausner et al. | 364/900 |

*Primary Examiner*—David H. Malzahn
*Attorney, Agent, or Firm*—Garold E. Bramblett, Jr.

[57] ABSTRACT

A portable travel expense tabulator having the appearance of a conventional electronic hand-held calculator has a keyboard including a set of numerical input keys and a set of expense designating input keys. The device also includes a paper tape supply and takeup and a print-out device. By pressing appropriate numerical keys and an expense key, one can print on the tape the symbol for the type of expense along with the dollar amount. A summation of the expenses is carried in an electronic memory. Additional inputs include an exchange rate designator which can be preset at a monetary exchange rate. Local currencies are keyed in by the numerical keys and are converted to dollars before print-out. Also, mileage expenses may be computed and printed by mileage and cents-per-mile inputs. Dates may also be printed on the tape by means of the keyboard input.

13 Claims, 3 Drawing Figures

PORTABLE TRAVEL EXPENSE TABULATOR

BACKGROUND OF THE INVENTION

This invention relates to a travel expense record keeping device and more particularly to such a device which is electronic and portable.

In the past, it has been necessary for traveling businessmen to maintain written records in order to document travel expenses for expense reimbursement and income tax deductions. Businessmen often attempt to collect receipts for all expenses, or they must remember the expenses and record those expenses before they forget them. Using either receipts or memory is generally inconvenient and a businessman often fails to itemize valid expenses. Expense accounting becomes even more complicated when traveling in a foreign country where the businessman is faced with varying and often fluctuating exchange rates.

An object of this invention is to provide a travel expense tabulator for recording an expense record, the tabulator being portable and thus always on hand for recording each individual expense as it occurs.

A further object of this invention is to provide such a travel expense tabulator whereby expenses may be recorded along with expense designating representations or symbols.

Another object of the invention is to provide a tabulator whereby the expenses are tabulated in a single monetary unit even though the keyed input into the tabulator is in a foreign currency.

Yet another object of this invention is to provide a portable travel expense tabulator which maintains a running summation of all expenses for easy recall throughout a trip.

SUMMARY

A portable travel expense tabulator comprises a set of numerical input keys, each having a numerical representation associated therewith, and a set of expense designating input keys, each having a travel expense representation associated therewith. A recording device is provided for recording the numerical inputs and associated travel expense inputs. The recording device is controlled by control circuitry responsive to actuation of the numerical input keys and expense designating keys.

By providing a paper tape supply and takeup the itemized expenses can be printed on the tape, and the tape may later be removed and attached to an expense report or the like.

An adjustable exchange rate designating means is provided for presetting a monetary exchange rate reference; and the control circuitry is responsive to actuation of the numerical input keys and the monetary exchange rate reference to provide a monetary output in predetermined monetary units such as dollars.

Mileage expenses may be computed and recorded by first entering a mileage numerical input and then a cost-per-mile numerical input.

A date may be entered into the tabulator and be recorded with associated expenses, and an electronic memory retains the summation of all inputs during a given period.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
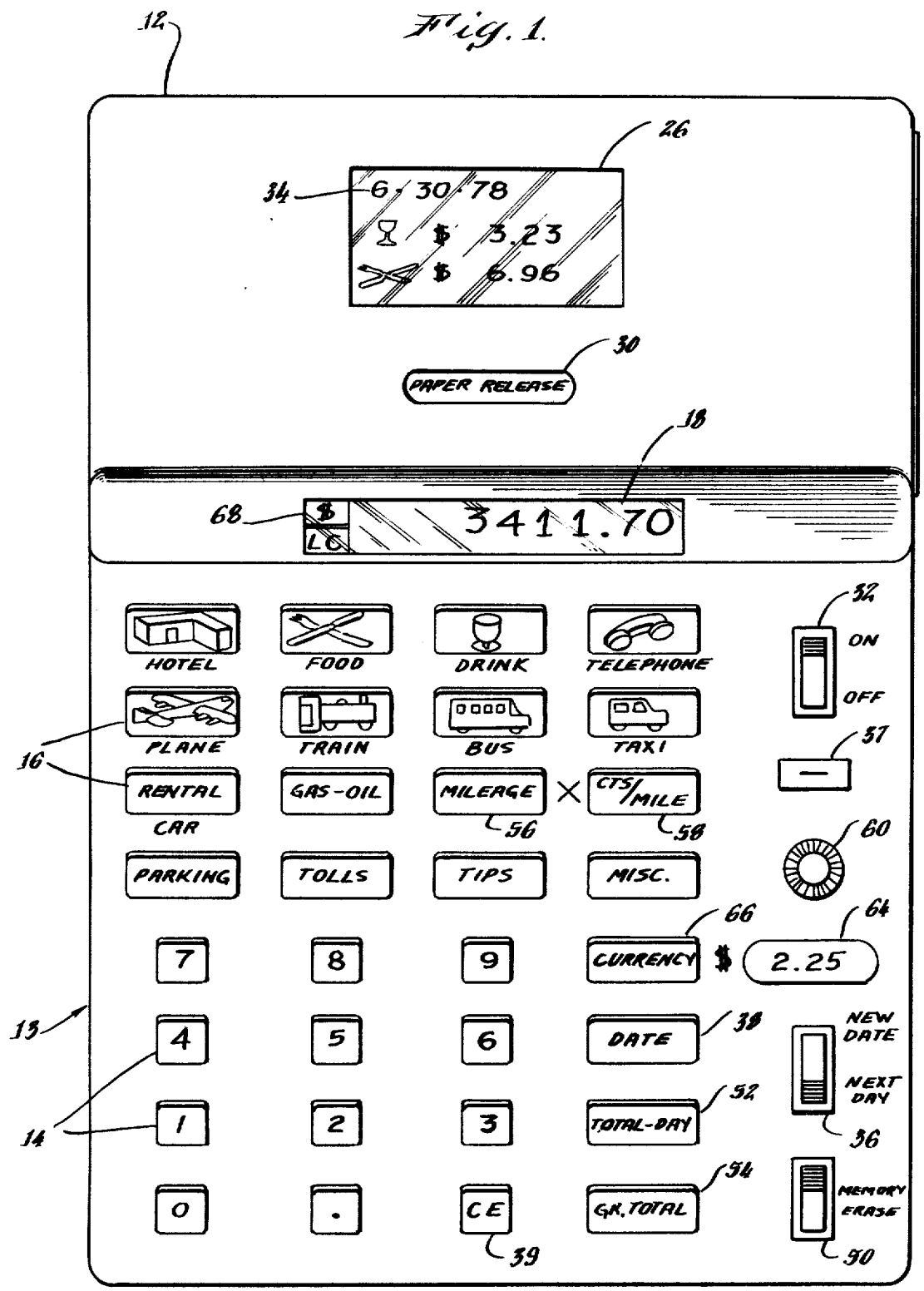
FIG. 1 is a plan view of the hand-held portable expense tabulator having a set of numerical input keys and a set of expense designating input keys on a keyboard.
Figure 2:
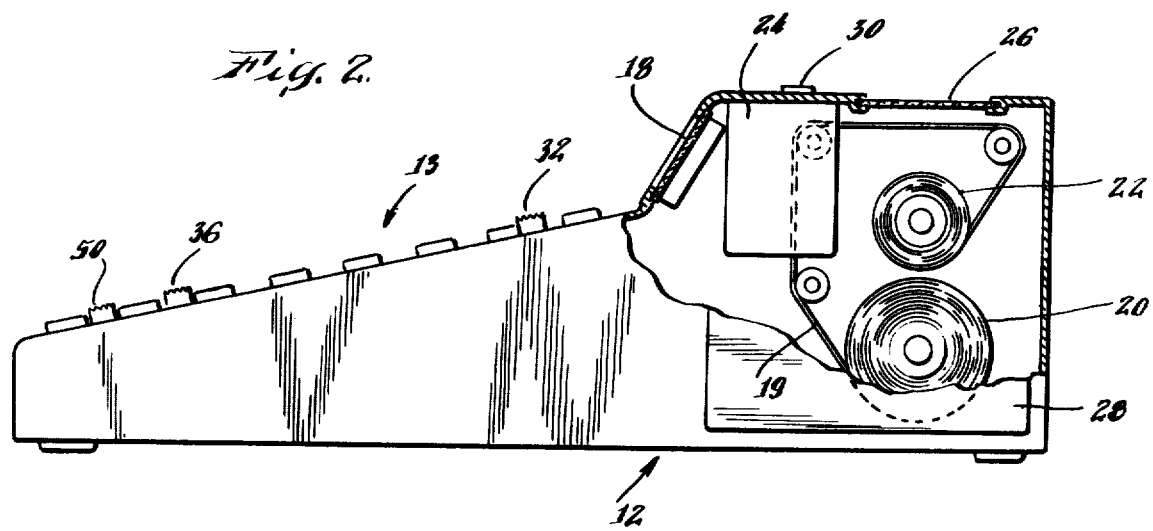
FIG. 2 is a side view of the portable travel expense tabulator of FIG. 1 partially broken away to show the paper tape feed and takeup and the print-out device.

A portable travel expense tabulator shown in FIGS. 1 and 2 has the general appearance of a conventional hand-held calculator. As shown in the plan view of FIG. 1, the tabulator 12 includes a keyboard 13 having a set of numerical input keys 14 and a set of expense designating input keys 16. A digital display 18, such as a light emitting diode or liquid crystal display, is provided above the keyboard.

As shown in FIG. 2 a paper tape 19 is taken from a paper tape supply roll 20, passed through a printer 24, and then stored on a paper tape takeup roll 22. Before being taken up by the takeup roll 22, the paper tape passes below a window 26 to be viewed as shown in FIG. 1. A door 28 is provided at the side of the tabulator housing. This door is opened by a paper release button 30 in order that the paper tape may readily be replaced.

To provide an itemized expense record, the user turns the device on by an on/off switch 32. The date may then be printed on the paper 19 as at 34 of FIG. 1 by placing the switch 36 in the new date position, entering the date by the numerical keys 14, and pressing the date button 38. Each individual expense may then be printed on the tape by first pressing the appropriate numerical input keys 14 and an expense designating key 16. When an expense designating key is pressed, the dollar amount and an expense representation are prined on the tape as shown in FIG. 1. As the expense designating keys serve to perform the entering function, the usual "enter" key is not required. This also prevents the user from inadvertently neglecting to identify an expense. If an improper expense amount is keyed in, it can be cleared by pressing the clear-entry key 39 before pressing an expense key 16. A minus key 37 permits an erroneous expense entry to be subtracted from both tape and memory.

Figure 3:
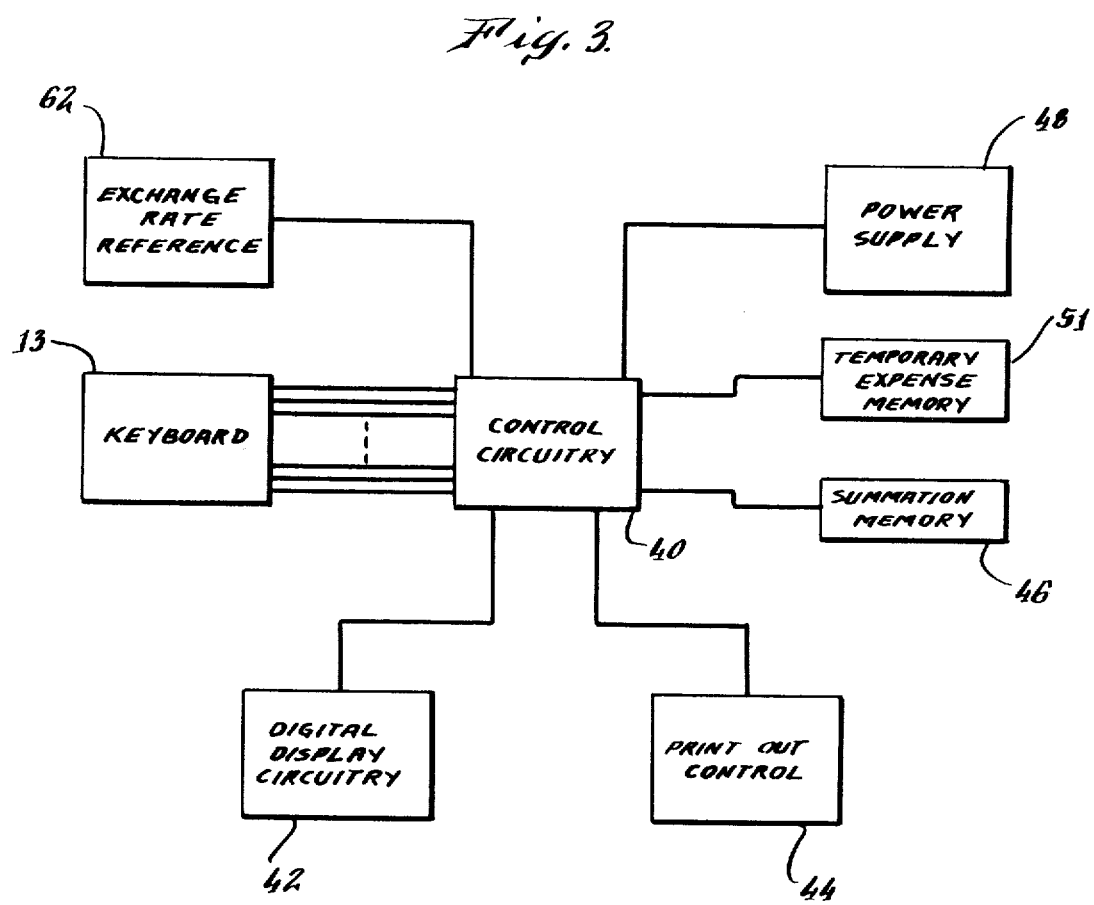
FIG. 3 is a block diagram of the electronic circuitry for use in the portable travel expense tabulator of FIGS. 1 and 2.

Electronic circuitry for the tabulator of FIGS. 1 and 2 is shown in FIG. 3. Control circuitry 40, which may be large scale integrated circuitry, is responsive to signals received from the keyboard 13 to control the digital display 18 through the display circuitry 42 and to control the recording of numerical inputs and travel expense representations through print-out control 44. An erasable memory 46 is also provided to maintain a running summation of the expenses printed on the tape 19.

The memory 46 is preferably of a nonvolatile type; that is, the summation is retained even though the power supply 48 is turned off by switch 32. To begin a new tabulation, it is necessary to erase the memory by means of switch 50. Alternatively, the memory may be a low power memory and the switch 50 could be used to place the tabulator in a memory-only mode. In that mode, power would only be used to sustain the memory and the input, display and print-out circuitry would be inoperable.

When an expense is entered by keys 14, that individual expense is temporarily held in a memory 51. Then, when an expense key 16 is pressed, the control circuitry responds by printing the expense held in memory 51 and by summing that expense with the total stored in memory 46. The new sum then replaces the old in summation memory 46. The individual expense in temporary memory 51 may then be erased or it may be retained for display until the next expense is entered.

At the end of a day, the summation of all expenses of that day may be displayed on digital display 18 and printed on the tape by pressing the total day button 52. The tabulator can then be connected to an electrical outlet to recharge the rechargeable power supply 48. On the next day, the switch 36 is placed in the next day position and the date button 38 is pressed to print the new date. Alternatively, the date can be entered by means of keyboard 14 by first moving the switch 36 into the new date position as before. At the end of a trip, the total for the trip can be printed and displayed by pressing the grand total switch 54.

Expenses are often calculated on the basis of mileage driven in a personal automobile. To record such expenses, the user first presses the appropriate numerical input keys 14 for the miles traveled and the mileage button 56. He then presses a predetermined numerical input for the cost-per-mile and finally the cents-per-mile button 58. The expense recorded on the tape 19 is the product of the mileage and the cost-per-mile.

When a businessman is in a foreign country, it is often necessary to convert from the local currency of that country to dollars. Such conversions greatly complicate the expense reporting process. To overcome those complications, the present tabulator includes an exchange rate designating dial 60 which may be adjusted to preset a reference 62 (FIG. 3) to a monetary exchange rate displayed at 64. As an alternative, the exchange rate reference may be adjusted by keying the appropriate amount by means of numerical input keys 14. The exchange rate reference takes the form of an analog device such as a potentiometer where a dial 60 is used, and is entered directly in digital form where the numerical input keys 14 are used.

To record an expense in dollars while in a foreign country it is only necessary for the businessman to press the appropriate numerical input keys 14 corresponding to the expense in the foreign currency and to then press the currency key 66. The foreign currency is automatically converted to provide a dollar output from the control circuitry 40 to the digital display 42 and print-out 44. By then pressing an expense key 16, the expense is recorded.

The display 18 includes at 68 a dollar symbol over a local currency indication LC. If the exchange rate is set at other than 1.00 the LC, and not the dollar symbol, is displayed when an expense is first entered by the numerical keys 14. Then, when the currency key 66 is pressed, the numerical display changes to the converted value and the display 68 changes over to the dollar symbol.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A portable travel expense tabulator capable of recording, printing and storing records of various expenses commonly incurred on business trips, said tabulator comprising:

a set of numerical input keys, each of said numerical input keys having a numerical representation associated therewith;

a set of expense designating input keys, each of said expense designating input keys having a symbolic travel expense representation associated therewith;

control circuitry responsive to actuation of said numerical input keys and said expense designating input keys;

a recording device including a memory and a printer controlled by said control circuitry for recording and printing numerical inputs from said numerical input keys with associated travel expense representations from said expense designating input keys, and means associated with said printer for storing printed records, said control circuitry including means for selectively electrically coupling said numerical input keys and said expense designating input keys to said recording device.

2. A portable travel expense tabulator comprising:

a keyboard including first and second sets of input keys, said first set of keys providing a numerical input and said second set of keys providing a symbolic expense designating representation;

control circuitry responsive to actuation of said first and second sets of input keys;

a recording device including a printer and a memory controlled by said control circuitry for tabulating and printing an expense record with actuation of said first and second sets of input keys;

means for providing a record tape supply to said printer so that said expense record is printed on said record tape; and a record tape takeup for storing said printed record tape when an expense record has been recorded thereon, said control circuitry including means for selectively electrically coupling said first and second sets of input keys to said recording device.

3. A portable travel expense tabulator comprising:

a set of numerical input keys, each of said numerical input keys having a numerical representation associated therewith;

a set of expense designating input keys, each of said expense designating input keys having a symbolic travel expense representation associated therewith;

a recording device including a printer and a memory for recording and printing numerical inputs from said numerical input keys with associated travel expense designations from said expense designating input keys;

means associated with said printer for storing printed records, and control circuitry for receiving a numerical input from said numerical input keys and responsive to subsequent actuation of an expense designating input key to control recording and printing of said numerical input with an expense designation by said recording device, said control circuitry including means for selectively electrically coupling said numerical input keys and said expense designating input keys to said recording device.

4. A portable travel expense tabulator as claimed in claim 2 or 3 and including an adjustable exchange rate designating means for presetting a monetary exchange rate reference, said control circuitry being responsive to said monetary exchange rate reference for recording and printing said numerical inputs in predetermined monetary units, said control circuitry including means for selectively electrically coupling said exchange rate designating means to said numerical input keys for adjusting the input from said numerical input keys in accordance with a predetermined value corresponding to said predetermined monetary units.

5. A portable travel expense tabulator as claimed in claim 2 or 3 and including keys providing numerical mileage and cents-per-mile inputs to said control circuitry, said control circuitry being responsive to those inputs to record and print the product of those inputs as an expense, said control circuitry including means for calculating the product of said mileage and said cents-per-mile inputs and electrical connection means for providing said product to said recording device.

6. A portable travel expense tabulator as claimed in claim 1, 2 or 3 wherein said printer of said recording device is a paper tape print-out device.

7. A portable travel expense tabulator as claimed in claim 1, 2 or 3 wherein said memory includes a first temporary memory for recording input from said set of numerical input keys and a second summation memory for recording a summation of all input from said set of numerical input keys,
said control circuitry including means for electrically coupling said first temporary memory to said second summation memory so that all numerical input in said first memory is transferred to said second memory to be stored therein.

8. A tabulator as claimed in claim 7 further including means for visually displaying numerical input in said second summation memory, said control circuitry including means for selectively connecting said second summation memory to said means for visually displaying.

9. A portable travel expense tabulator as claimed in claim 1, 2 or 3 and including a date key, said control circuitry being responsive to a numerical input from said numerical input keys and said date key to record a date, said control circuitry including means for selectively electrically coupling said date key to said recording device.

10. A portable travel expense tabulator as claimed in claim 1, 2 or 3 and including a rechargeable portable power supply.

11. A portable expense tabulator as claimed in claim 1, 2 or 3 further including means for visually displaying input from said numerical input keys, said control circuitry including means for electrically connecting said numerical input keys to said means for visually displaying.

12. A portable travel expense tabulator capable of recording, printing and storing records of various expenses commonly incurred on business trips, said tabulator comprising:
a set of numerical input keys, each of said numerical input keys having a numerical representation associated therewith;
a set of expense designating input keys, each of said expense designating input keys having a symbolic travel expense representation associated therewith;
control circuitry responsive to actuation of said numerical input keys and said expense designating input keys;
a recording device including a memory and a printer controlled by said control circuitry for recording and printing numerical inputs from said numerical input keys with associated travel expense representations from said expense designating input keys,
and means associated with said printer for storing printed records,
said control circuitry including means for selectively electrically coupling said numerical input keys and said expense designating input keys to said recording device, and
an adjustable exchange rate designating means for presetting a monetary exchange rate reference, said control circuitry being responsive to said monetary exchange rate reference for recording and printing said numerical inputs in predetermined monetary units, said control circuitry including means for selectively electrically coupling said exchange rate designating means to said numerical input keys for adjusting the input from said numerical input keys in accordance with a predetermined value corresponding to said predetermined monetary units.

13. A portable travel expense tabulator capable of recording, printing and storing records of various expenses commonly incurred on business trips, said tabulator comprising:
a set of numerical input keys, each of said numerical input keys having a numerical representation associated therewith;
a set of expense designating input keys, each of said expense designating input keys having a symbolic travel expense representation associated therewith;
control circuitry responsive to actuation of said numerical input keys and said expense designating input keys;
a recording device including a memory and a printer controlled by said control circuitry for recording and printing numerical inputs from said numerical input keys with associated travel expense representations from said expense designating input keys,
and means associated with said printer for storing printed records,
said control circuitry including means for selectively electrically coupling said numerical input keys and said expense designating input keys to said recording device,
said numerical keys including keys providing numerical mileage and cents-per-mile inputs to said control circuitry, said control circuitry being responsive to said numerical mileage and cents-per-mile inputs to record and print the product of those inputs as an expense, said control circuitry including means for calculating the product of said mileage and said cents-per-mile inputs and electrical connection means for providing said product to said recording device.

* * * * *